United States Patent [19]

Williams et al.

[11] Patent Number: 4,901,564
[45] Date of Patent: Feb. 20, 1990

[54] ELECTRICAL DETECTION OF THUNDERSTORM MICROBURSTS

[76] Inventors: Earle R. Williams, 58 Corey Rd., Brookline, Mass. 02146; Ralph J. Markson, 46 Kendal Common Rd., Weston, Mass. 02193

[21] Appl. No.: 116,482

[22] Filed: Nov. 2, 1987

[51] Int. Cl.$^4$ ............................................. G01W 1/00
[52] U.S. Cl. .................................. 73/170 R; 340/601; 324/72
[58] Field of Search ....................... 73/170 R; 324/72; 340/601, 968, 602

[56] References Cited

U.S. PATENT DOCUMENTS

| | | | |
|---|---|---|---|
| 3,215,997 | 11/1965 | Leavitt et al. | 340/601 |
| 3,790,884 | 2/1974 | Kohl | 73/170 R X |
| 4,023,408 | 5/1977 | Ryan et al. | 73/170 R |
| 4,276,576 | 6/1981 | Uman et al. | 340/601 X |

Primary Examiner—Charles A. Ruehl

[57] ABSTRACT

An array of sensors responsive to atmospheric electrostatic fields is deployed, preferably with the sensors elevated above the ground. Suitable sensors are corona point sensors having a stainless steel needle. The corona current signals from the sensors are digitized and processed to determine the peak in the rate of sharp discontinuities in the electrostatic field. The peak in the rate of sharp discontinuities precedes a thunderstorm microburst by several minutes. The signal processing apparatus also generates equipotential contour maps of electrostatic field for spatially locating a microburst. The latter signal may also serve as a predictor for windshear since anomalous electric fields caused by charge carrying downdrafts may occur without lightning.

17 Claims, 5 Drawing Sheets

ELECTRICAL DETECTION OF THUNDERSTORM MICROBURSTS

BACKGROUND OF THE INVENTION

The Government has rights to this invention pursuant to Contract Number F19628-85-C-0002 Awarded By The Department Of The Air Force.

This invention relates to the electrical detection of thunderstorm microbursts utilizing sensors responsive to the atmospheric electrostatic field.

Microbursts are strong downdrafts emanating from thunderclouds. When the downwardly moving column of air encounters the earth surface, the velocity becomes horizontally oriented. This condition is particularly hazardous to aircraft near the ground during take-off and landing. Several major airliner crashes have been attributed to the wind shear resulting from thunderstorm induced microbursts.

Because microbursts are so dangerous, considerable effort has been devoted to their prediction and detection. One approach is the use of Doppler radar. There are, however, characteristics of Doppler radar which limit its effectiveness. First of all, Doppler radar responds only to precipitation particles, not to the moving air. Under certain conditions, precipitation will have evaporated as the downwardly moving air column of the microburst nears the surface rendering its detection difficult with Doppler radar. Another disadvantage of Doppler radar is that it is usually deployed so that it looks toward the horizon. Because of this orientation, the Doppler radar is insensitive to the vertical motions of the downwardly moving column of air and would detect downbursts only after they turned horizontal near the earth's surface which would provide no advance warning of the microburst.

In addition to Doppler radars, wind sensors are also recognized for observing microbursts. A wind sensor array records wind direction and velocity. A computer processes information from the array of wind sensors and produces a map showing small scale variations in the wind field. Automatic alarms can be included in software to alert operators when there are abrupt changes in wind velocity or direction or when the velocity gradient exceeds preselected thresholds. Such systems, which have been implemented at some major airports, are useful in detecting the arrival of wind gusts which might come from nearby thunderstorms or other sources. However, since the array of sensors is located on or close to the ground, the sensors cannot detect wind shear or downbursts before they reach the ground nor do they have a remote detection capability for observing wind away from the instrumented area. The present invention provides apparatus and method for predicting the occurrence and location of a microburst several minutes before the wind shear at ground level occurs.

SUMMARY OF THE INVENTION

The apparatus according to one aspect of the invention includes at least one sensor responsive to atmospheric electrostatic fields and signal processing equipment connected to the sensor for determining the rate of sharp discontinuities in the electrostatic field caused by total (intracloud and cloud to-ground) lightning activity. The peak in the rate of sharp discontinuities has been found to precede a microburst by several minutes. It is preferred that the sensors be deployed in an array with approximately one kilometer spacing. Suitable sensors are corona point sensors having a metallic needle such as stainless steel mounted on an insulated pole. It is also preferred that the sensors be located above ground beyond the natural corona layer which can occur near the earth's surface when thunderstorms are in the vicinity. In one embodiment, the signal processing apparatus includes an amplifier responsive to the corona current in the sensors to produce a voltage output, an A/D converter for digitizing the voltage output, and a digital computer for determining the peak in the rate of discontinuities.

The signal processing apparatus may also determine reversals in the electrostatic field polarity and/or rapid increases in electric field intensity for spatial location of the microburst and production of windshear occurrence and location. In this aspect of the invention, a two dimensional array of electric field sensors responsive to atmospheric electrostatic fields is deployed at or above ground level. The sensors in the array are connected to a computer which generates equipotential or potential gradient contour maps of the electrostatic field. These contour maps include closed concentric curves and the centers of the smallest closed curves identify the location of the microburst. It should be recognized that the development of characteristic closed concentric patterns on the map would serve as a predictor of microbrusts and wind shear even if there is no lightning. In addition, the relative amplitude of the rapid lightning produced fluctuations can also be used for locating the microburst when the sensors are in an array since signal intensity decreases with distance.

DESCRIPTION OF THE PREFERRED EMBODIMENT

Figure 1:
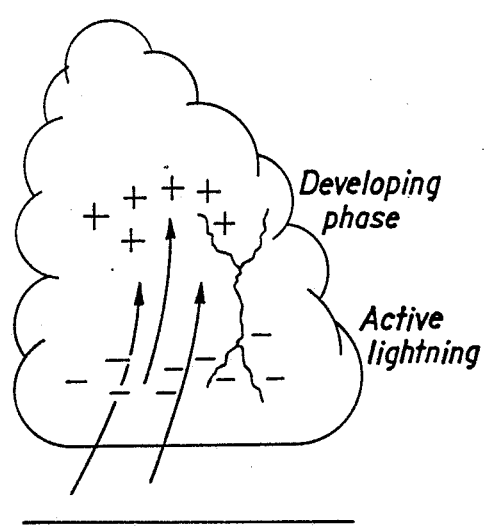
FIG. 1 is a schematic view of the developing phases of thunderstorms.

First of all, the theoretical basis of one aspect of the present invention will be discussed. With reference to FIG. 1, the developing phases of thunderstorms are characterized by the engulfment of moisture, by strong updrafts, and by the growth and accumulation of precipitation particles aloft at elevations of six to fifteen kilometers. The electrical activity of a cloud closely parallels this vertical development, and lightning rate is a major manisfestation of the extent of this vertical development. See, Williams, E.R., "Large Scale Charge Separation in Thunderclouds", J. Geophys. Res. 90, 6013–6025, 1985. The total lightning activity is composed of intracloud and cloud to ground events, and the intracloud component dominates during the period of vigorous upward growth.

Figure 2:
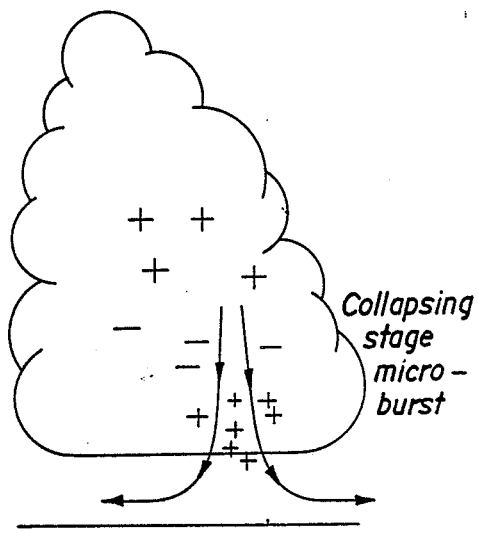
FIG. 2 is a schematic view of the collapsing stage microburst.

The occurrence of microbursts, which are predicted by this invention, are strong downdrafts typically with diameters of a fraction of 1 km. to several km. and tend to occur subsequent to the earlier vertical development of the cloud. See FIG. 2. Indeed, microbursts are generally believed to be caused by the effects of precipitation aloft by virtue of (1) the downward acceleration of the air due to mass loading, (2) the negative buoyancy induced by melting of ice particles, and (3) the negative buoyancy induced by the evaporation of raindrops at lower levels. The maximum downward air motions at low levels, the result of these downward accelerations, naturally lag the maximum precipitation growth aloft and total lightning activity. Observations now available are consistent with the foregoing picture. Measurements of the total lightning rate show a rapid increase (one flash/min. per minute) in total lightning rate to a well defined peak of five ten flashes per minute with a decline in rate thereafter. The maximum microburst intensity at ground level as observed with a Doppler radar lags the time of peak lightning rate by five ten minutes. On a few occasions, the peak flash rate has been noted in advance of any indication of divergent outflow by the Doppler radar.

Figure 3:
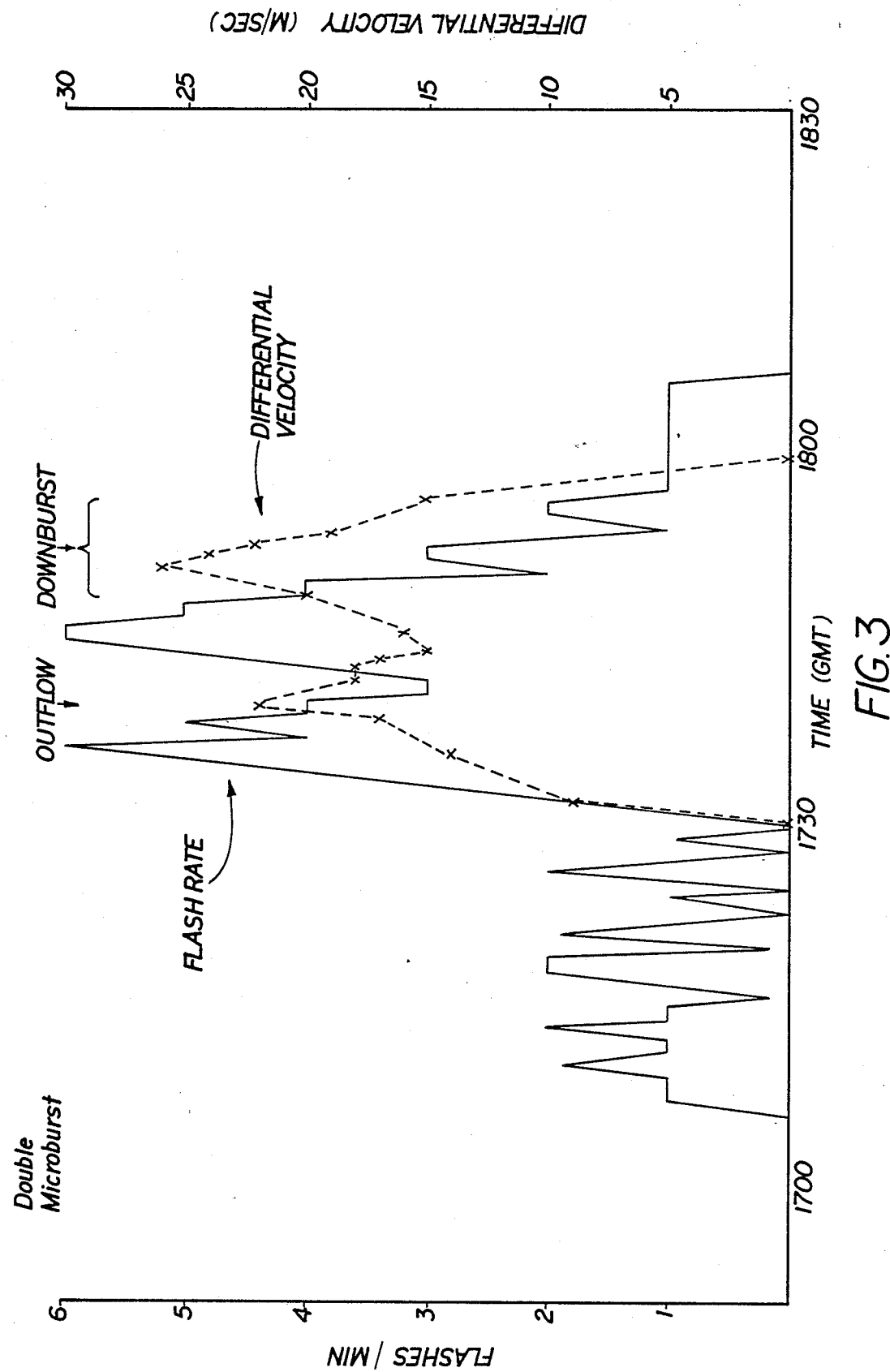
FIG. 3 is a graph of lightning flash rate and differential velocity versus time.

FIG. 3 is an example of such a time sequence for an actual thunderstorm occurring in Huntsville, Alabama. This record shows two peaks in total lightning flash rate followed by two microbursts with the microbursts lagging the peak total lightning flash rate by several minutes.

Figure 4:
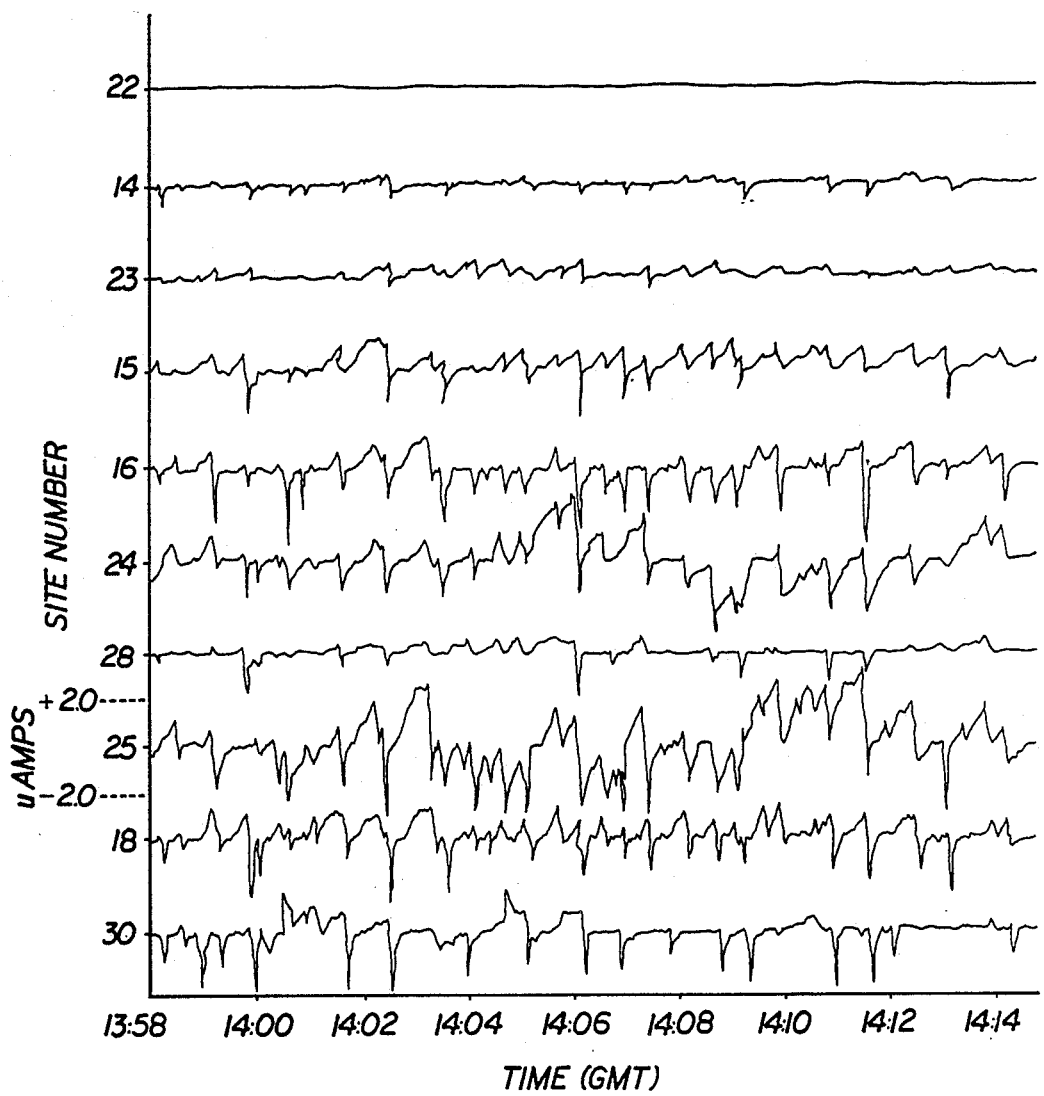
FIG. 4 is a graph of corona current versus time for an array of sensors.

As will be discussed subsequently herein, it is preferred that the sensors responsive to atmospheric electrostatic fields be deployed in arrays. FIG. 4 is a record from a currently operational array of corona points in Huntsville, Alabama. Note that sudden discontinuities associated with lightning appear simultaneously at all stations in the array, but with different amplitudes. The information contained in FIG. 4 can be used to create contour maps for spatial localization of the microburst.

In order to carry into practice the theoretical basis of the present invention, an array of electric field sensors, hereafter referred to as corona points, is deployed with spacings of the order of one kilometer. The size of the array, and hence the number of individual sensors, is dictated by the area for which one seeks protection from microburst hazard. As will be readily appreciated, the accuracy with which lightning locations are determined increases with the size and number of sensors in the array. Although corona points are the preferred electrostatic field sensor, for reasons of simplicity of construction and their insensitivity to the effects of rain the present invention encompasses all devices capable of measuring electric fields such as field mills and radioactive probes. The corona points respond to the electrostatic field resulting from electric charge in nearby electrified clouds, and also respond to the sudden change in electrostatic field which is the result of any kind of lightning discharge.

Figure 5:
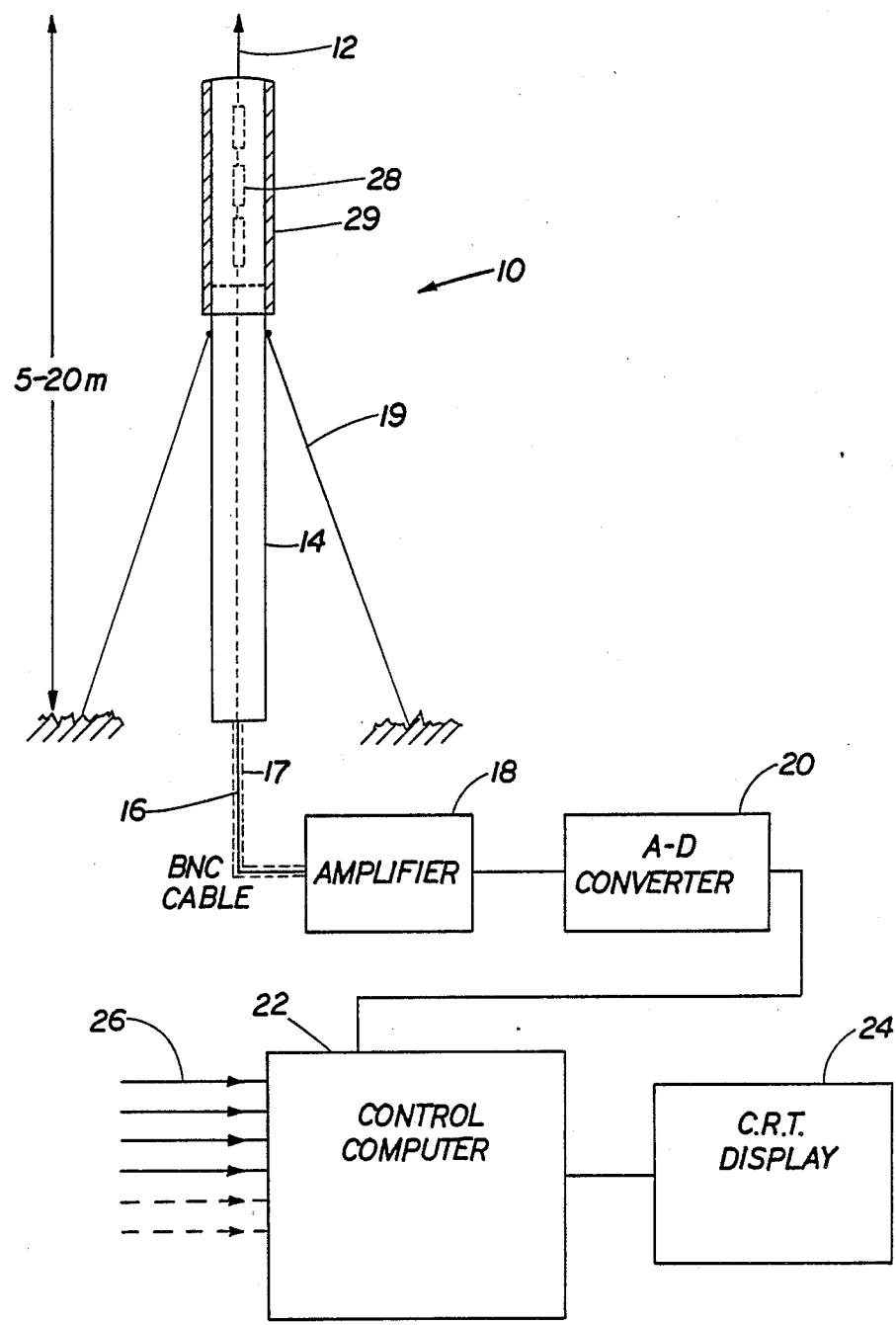
FIG. 5 is a schematic illustration of one of the sensors of the microburst detection system disclosed herein.

With reference to FIG. 5, a corona point sensor 10 includes a stainless steel needle 12 mounted on a pole 14 and 29. The pole in one configuration may be made entirely of insulating material. But it could also be metallic for most of its length, with only a short insulating section containing a chain of high ohm resistors 28 needed for the top section. The pole may be supported with a non-conducting guy 19. The needle 12 is electrically connected to a chain of high ohm resistors 28. The total resistance should be $5 \times 10^{10}$ ohms or greater to minimize sensitivity to wind velocity. The resistor chain spreads out the equipotential lines passing through the high ohm resistance to reduce potential gradient there and eliminate possible electrical breakdown across the resistor or from the conducting path to the surrounding atmosphere. The bottom of the resistor is connected to the center conductor of a shielded cable 16 which carries the corona current to an amplifier 18. The shield 17 connects to the bottom of the metallic pole or extends up to just below the high ohm resistor chain if a non-conducting pole is used. The amplifier 18 converts the corona current input to a voltage output which is then digitally sampled at a ten hertz rate in an analog to digital converter 20. The digitized signal from the analog to digital converter 20 is then conveyed to a computer 22 for signal processing. The computer 22 also receives digital inputs indicated by arrows 26 from other corona point sensors (not shown) in an array of sensors. A CRT 24 may be provided to display the output from the computer 22.

All of the corona point sensors in the array such as the sensor 10 are identically mounted on towers. Five meter poles are satisfactory, but greater sensitivity to small fields is achieved with higher sensors. It is preferred that the corona point sensors be located above the natural corona layer near the earth's surface to avoid interference with the electrical interpretation of the thunder cloud overhead.

The computer 22 carries out three kinds of data processing on the simultaneously digitized voltages from the plural sensors in the array. This data processing is (1) Contour plotting in x-y coordinates of the electrostatic field over the array. This aspect will be discussed further below.

(2) Identification of sharp discontinuities in the electrostatic field which are associated with lightning, and a running tabulation of the rate of such occurrences.

(3) Measurement of the change in electrostatic field associated with the lightning discharges and a real time inversion of the simultaneous voltage changes over the array to determine the x, y, z location of the lightning charge rearrangement in the cloud, and a measure of the electric charge transferred by the lightning.

These techniques have been well studied by Krehbiel et al. in "An Analysis of the Charge Structure of Lightning Discharges to Ground", J. Geophys. Res., 84, 2432–2456, 1979, the teachings of which are incorporated herein by reference. Contour plots of field change are useful in establishing the x-y location of the lightning. All of these signal processing tasks are handled with canned software packages as will be readily appreciated by those skilled in the art.

As stated above, Doppler radar, wind sensors and pressure sensors have all been tested as microburst detectors. All three have been shown to work, but all three suffer the disadvantage that they respond to manifestations of microbursts at ground level only. The electrical detection scheme of the present invention, on the other hand, is sensitive to the activity of the cloud electrical generator, which serves as a signal as much as several minutes before anything measurable at ground level is present. The extra lead time will be particularly valuable at airports for purposes of cordoning off areas of potential aviation hazard.

In principle at least, a Doppler radar can identify the location and severity of a microburst at the ground in real time. In practice, however, because the depth of the microburst outflow is often only a few hundred meters, radar "ground clutter" can present an obstacle to unambiguous detection. Furthermore, information on the vertical air motions which precede microbursts at ground level is not usually contained in the signals from a single Doppler radar.

A number of cloud to-ground lightning location systems, most notably LLP (Lightning Location and Protection) and LPATS (Lightning Position and Arrival Time System) are currently operational throughout the world. While these systems work well in identifying the cloud-to-ground subset of total lightning in real time, the cloud-to-ground component has been shown not to be a particularly valuable precursor for microbursts. Indeed, in several cases studied, the peak in cloud to ground lightning rate coincides with, rather than precedes, the time of the microburst. The real time measurement of the total lightning rate is of fundamental importance in the efficacy of the present invention.

In addition to predicting the occurrence of a microburst several minutes before the presence of effects at ground level, it is also desirable to know the location of the microburst. The spatial localization aspect of the present invention will now be discussed. When clouds become sufficiently deep and convective, they start to become charged. Although details of how clouds become electrified is still not fully understood, it is known that certain parts of the cloud become charged with particles of one polarity while other parts of the cloud have the opposite polarity, and screening layers can form at the top, sides and bottom of the cloud which can have space charge densities many times as large as regions within the cloud. Air motions and precipitation can carry charge from one part of the cloud to another and there is evidence that ambient temperature within the cloud and interactions between ice crystals and soft hail cause charge to accumulate at different height levels.

Another source of space charge which can accumulate in clouds as well as in the subcloud region, and in particular, close to the earth's surface, is space charge arising from points on the ground going into corona when thunderstorm intensity electric fields are present. The corona ions are of the opposite polarity from the charge in the lower portion of the cloud and thus tend to limit electric field intensity measured on or close to the ground. The space charge is carried aloft in convective updrafts under clouds as well as by turbulent eddy diffusion so some of this charge can enter the cloud. Observations indicate that this charge is mostly concentrated in a layer within a few meters of the ground although some of it can be carried aloft in lower number density forming a layer at least two hundred meters deep.

The above technical discussion of space charge within clouds and near the ground under and near thunderclouds is given because it will be shown below that air motions carrying this space charge can cause electric field variations that can be used to infer the air motions thereby to spatially locate microbursts and to predict wind shear occurrence. In addition, the sensing of these electric fields may be improved by installing sensors on poles or other supports above the ground away from most of the effect of space charge near the ground. There are several mechanisms by which air motion carrying space charge may result in electric field variations. A downdraft from the upper portion of a cloud may carry positive charge down through the cloud (including the negative charge layer in its central portion) into the subcloud region. This process would cause a reversal of the vertical electric field direction from the normal disturbed weather direction (electric field vector upward) to the fair-weather direction (electric field vector downward). Similarly, a downdraft penetrating the lower portion of the cloud might sweep away the negative space charge concentrated in a screening layer near the lower edge of the cloud which would expose the positive charges carried into the central portion of the cloud in the rain shaft and downburst air to electric field sensors below the cloud. This mechanism could cause an apparent change in polarity and/or intensity of electric fields near the ground under the downdraft region.

Others have postulated that air in a downburst may originate from the top of the cloud and go all the way to the ground. If this air came originally from horizontal convergence in the negatively charged electrode layer at the top of the cloud, it might be rich in negative charge and cause associated variations in electric fields near the ground. If this air transports negative charge to the lower portion of the cloud, it may cause an upwardly directed electric field sensed at ground level. Similarly, if downdrafts came from screening layers at the side of the cloud, they might contain negative charge and produce positive electric fields in the subcloud region. While the limited evidence to date indicates that microbursts are most commonly positively charged, it is important to recognize that screening layers, which are negatively charged most of the time, are generally regions of space charge density much higher (as much as one hundred times) than the space charge density of the diffuse (generally positive) charge in the cloud's interior. Thus, if downbursts contain air from screening layers, they could produce strong electric field perturbations associated with negative charge overhead.

In reviewing data from several experimental sites where Doppler radar (which senses wind velocity), normal radar (which senses precipitation intensity) and electric field measurements (which sense space charge) are present, it is has been determined that anomalous downwardly directed frequently occur in conjunction with downbursts and/or rain shafts. This circumstance suggests that downbursts may generally carry positive charge. Since the electric field is most strongly influenced by the closest charge in the lowest portion of the cloud where the downbursts and rain shafts are most frequently observed, the implication is that the latter are transporting positive charge downward below the reversal temperature level (near $-15°$ C.) where soft hail carries positive charge to the lower portion of the cloud. Since falling hail carries negative charge downward above the reversal temperature level, this phenomenon may be responsible for a tripole electrical structure of clouds. If this is the way charge is distributed in thunderclouds, it could explain why downbursts are associated with positive charge simply because the negative charge is mostly confined to the $-10°$ C. to $-20°$ C. temperature strata and possibly relatively thin screening layers leaving most of the cloud volume with positive space charge.

The above discussion has been provided only to illustrate the basic principle that organized air motions within electrified clouds will create electric field patterns sensed on the ground reflecting the air motions. It is the same buildup of electric fields within the clouds caused by vertical developments which leads to the increase in total lightning activity discussed above.

Figure 6:
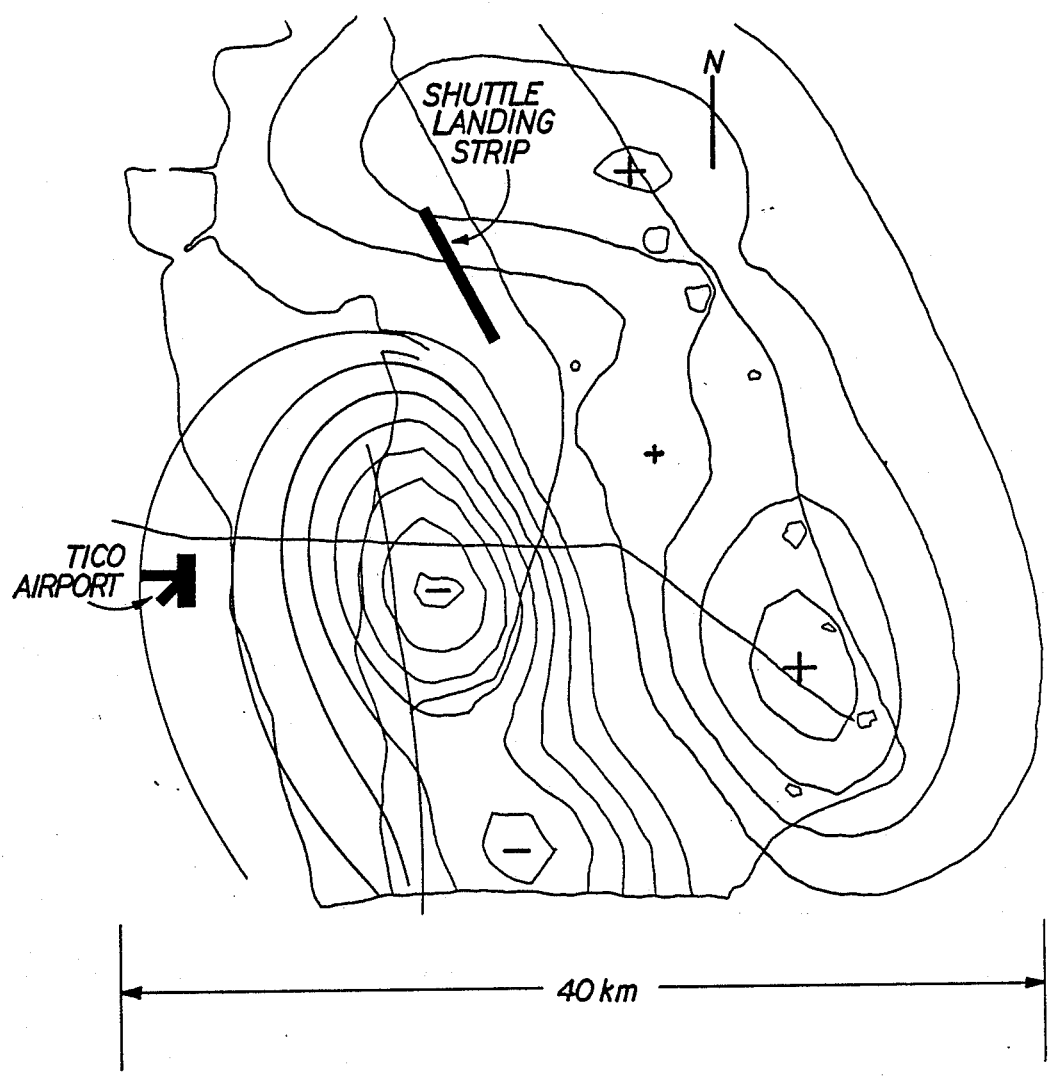
FIG. 6 is an equipotential contour map of the atmospheric electrostatic field generated from an array of sensors.

If a grid of electric field sensors is laid out, for example, along the approaches and departure corridors to airports, it will be possible to approximately locate the movement of space charge aloft and thus microbursts in these most critical regions of flight. The signals from the sensors in the array are processed by a computer to generate equipotential gradient contour maps. These contour maps include closed concentric curves and the center of the smallest closed areas will occur under centers of space charge aloft which will be concentrated in the downburst region. FIG. 6 is a contour map showing regions of positive and negative space charge utilizing a field mill network or array. The centers of the smallest closed curves are potential sites of microbursts. Since signal intensity increases with decreasing distance from the space charge, an increase in electric field intensity will occur as the charge is lowered in the downburst region which frequently would also contain a vertical column of falling rain (a rain shaft). Because electric fields can be sensed at a distance, the information from the contour map of FIG. 6 would constitute a remote detection technique and provide early warning of a microburst before the air reached the ground and turned horizontally to form a wind shear region. A 17 m/sec. downburst will move 1 km/min. so if detected when at a height of 5 km., there would be a five-minute warning before the air reached the ground.

Localization of microbursts using an array of sensors and the generation of contour maps would also be useful in dry air masses because charge cannot be destroyed. After the possible evaporation of rain in a dry subcloud region, the charge would still be carried in the downburst as ionized air molecules (fast ions) or as ionized aerosol particles (slow ions). The electrostatic sensing technique therefore can detect downbursts which are no longer visible to radar.

In order to record microbursts, it is desirable to have the electric field sensors, such as corona point sensors, separated by about the 1 km. scale which characterizes microbursts. Since the number of sensors in an array is proportional to the scale size squared, it is desirable to have the minimum number necessary to provide reliable detection. With aircraft moving about 3 km./min. on approaches and takeoffs, it is possible that aircraft could fly through smaller microbursts safely. Therefore it is possible that a spacing of 2 km. between sensors would be sufficient. It will be appreciated by those skilled in the art that the specific spacing of sensors will be determined to accommodate a specific application.

Figure 7:
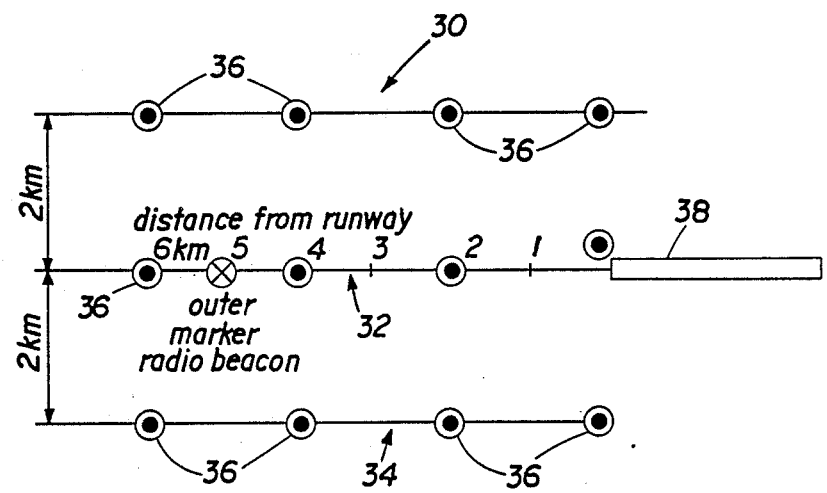
FIG. 7 is a schematic illustration of an array of electric field sensors in relation to an airport runway.

The most appropriate region to instrument with the electric field sensor array is the approach corridor from about the outer marker radio beacon, five miles from the runway threshold, to the runway. All aircraft on an ILS instrument approach as well as those conducting an ADF approach come over the outer marker at about 1500–1700 feet above the ground and fly down a 3° glide path to the end of the runway. FIG. 7 shows a suitable array of electrostatic field sensors. In particular, this array includes three linear segments 30, 32, and 34 containing individual electric field sensors 36. The sensors 36 are separated by two kilometer intervals and extend six kilometers from the end of a runway 38. There is also a two-kilometer separation between the linear segments 30, 32, and 34. This array therefore covers an area four kilometers by six kilometers along the final flight path and includes twelve sensors 36.

Similar arrays may be erected at the departure end of the runway 38 to cover the takeoff phase. Similarly, a grid extending over the airport itself would complete coverage of all critical areas. A video display of the electric field contours including the airport and surrounding area, which could be a radar traffic display and/or Doppler radar wind shear display, would be available to radar controllers in the control tower so aircraft can be kept away from dangerous downburst regions.

In order to minimize the effect of space charge near the ground which would tend to mask signals from space charge in the downburst further aloft, it is preferable to mount the sensors on poles from one or a few tens of meters high to sense electric fields above this space charge layer. Corona point sensors are particularly suited to this arrangement because with this system it is only necessary to support a needle, several small resistors and a wire connecting them to instruments on the ground. A flexible, lightweight, fiberglass fishing pole-type mast would suffice. Such a pole would provide a minimum hazard if struck by an aircraft, but aircraft do not normally fly within a few tens of meters of the ground before they are about to land on the runway.

Although other electric field sensors such as field mills and radioactive probes may be used, the corona point sensor system is preferred for predicting and locating microbursts. In the past, measurement of corona current has not been an accepted method for making quantitative measurements of electric field intensity because the current is sensitive to the cloud of space charge which surrounds the point and limits the current flow. Since the cloud size and ion density are a function of ventilation by the wind, such measurements are quite sensitive to wind velocity. A corona point sensor can be made less sensitive to wind by utilizing a high ohm resistor in series with the corona needle. The high ohm resistor limits wind dependence in two ways. First, by having most of the IR drop between ground and the atmosphere take place across a fixed resistor, which has a resistance larger than that of the ion cloud, the variable (wind dependent) part of the total series resistance takes place across only a small fraction of the total resistance. Second, the large resistance reduces the current to a fraction (on the order of 10%) of its value without the resistor. This limits the development of the space charge cloud at the corona point and thus the wind dependent space charge limiting of the current due to the ion cloud. Experiments have shown that with a $5 \times 10^{10}$ ohm or larger resistor, there is almost no wind dependence.

It is recognized that modifications and variations of the present invention will occur to those skilled in the art and it is intended that all such modifications and variations be included within the scope of the appended claims.

What is claimed is:

1. Apparatus for prediction of thunderstorm microbursts consisting of:
    at least one sensor responsive to atmospheric electrostatic fields; and
    signal processing apparatus connected to the at least one sensor for determining the rate of discontinuities in the electrostatic field, each peak in the rate of discontinuities being indicative of the likelihood for a future microburst.

2. The apparatus of claim 1 including a two-dimensional array of the sensors.

3. The apparatus of claim 2 wherein the sensors in the array are spaced approximately one kilometer apart.

4. The apparatus of claim 1 wherein the sensors are corona point sensors.

5. The apparatus of claim 4 wherein the corona point sensors comprise a metallic needle mounted on an insulated pole.

6. The apparatus of claim 5 wherein the needle is stainless steel.

7. The apparatus of claim 5 wherein the insulated pole extends beyond the natural corona layer near the earth's surface.

8. The apparatus of claim 7 wherein the insulated pole is approximately twenty meters in height.

9. The apparatus of claim 1 wherein the sensor is adapted to generate a corona current and the signal processing apparatus comprises an amplifier responsive to the corona current in the sensor to produce a voltage output;
   an A/D converter for digitizing the voltage output; and
   a digital computer for determining any peak in the rate of discontinuities.

10. The apparatus of claim 2 wherein the signal processing apparatus further determines reversals in the electrostatic field polarity.

11. Method for prediction of thunderstorm microbursts comprising:
    detecting any peak in the rate of discontinuities in the atmospheric electrostatic field, each peak being indicative of the likelihood for a future microburst.

12. The method of claim 11 wherein the electrostatic field is detected with corona points.

13. The method of claim 11 wherein the electrostatic field is detected above the natural corona layer near the earth's surface.

14. Apparatus for determining the location of thunderstorm microbursts comprising:
    a two-dimensional array of electric field sensors responsive to atmospheric electrostatic fields; and
    signal processing apparatus interconnected to the sensors in the array of sensors, the signal processing apparatus including computing apparatus adapted to generate equipotential contour maps of the electrostatic field, the contour maps including closed concentric curves, the centers of the smallest closed curves identifying the location of microbursts.

15. The apparatus of claim 14 wherein the electric field sensors are corona point sensors.

16. The apparatus of claim 14 wherein the electric field sensors are mounted above ground level.

17. The apparatus of claim 14 wherein the sensors in the array are separated by approximately one kilometer.

* * * * *